P. MacGAHAN.
ELECTRICAL MEASURING INSTRUMENT.
APPLICATION FILED SEPT. 3, 1907.

956,714.

Patented May 3, 1910.

2 SHEETS—SHEET 1.

WITNESSES:
C. L. Belcher
Otto S. Schairer

INVENTOR
Paul MacGahan
BY
Wesley G. Carr
ATTORNEY

UNITED STATES PATENT OFFICE.

PAUL MacGAHAN, OF WILKINSBURG, PENNSYLVANIA, ASSIGNOR TO WESTINGHOUSE ELECTRIC & MANUFACTURING COMPANY, A CORPORATION OF PENNSYLVANIA.

ELECTRICAL MEASURING INSTRUMENT.

956,714.      Specification of Letters Patent.      Patented May 3, 1910.

Application filed September 3, 1907. Serial No. 391,217.

*To all whom it may concern:*

Be it known that I, PAUL MACGAHAN, a citizen of the United States, and a resident of Wilkinsburg, in the county of Allegheny and State of Pennsylvania, have invented a new and useful Improvement in Electrical Measuring Instruments, of which the following is a specification.

My invention relates to electrical measuring instruments, and it has for its object to provide an instrument the parts of which shall be so constructed and arranged that it may be readily assembled and may be dismantled for repairs without affecting its sensitiveness or requiring recalibration of its scale, and that at the same time shall be simple and compact in construction.

Figure 1:
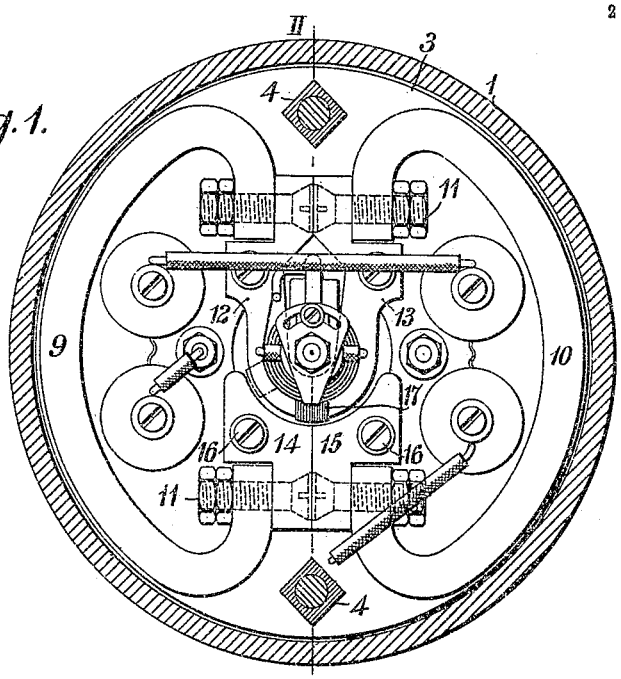
Figure 2:
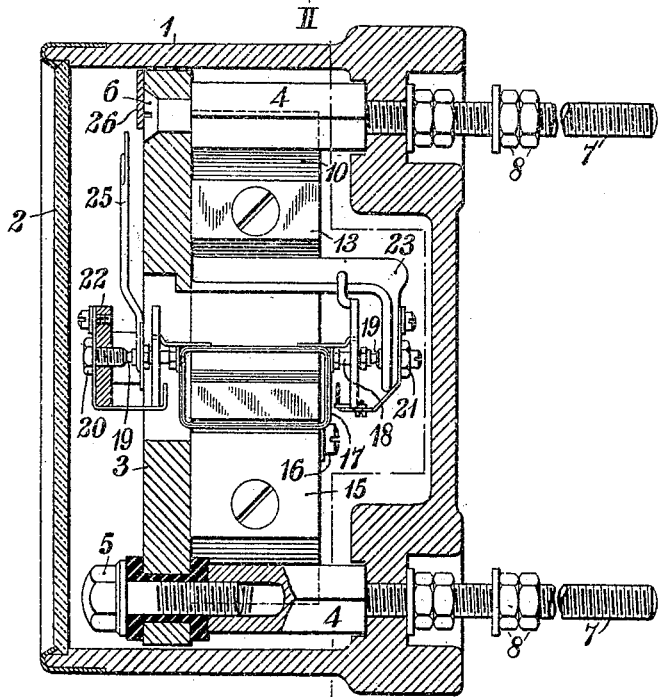
Figure 3:
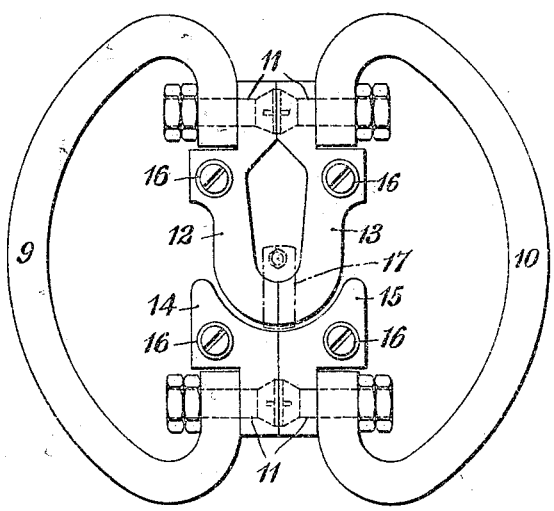

Figure 1 of the accompanying drawings is a back face view of an instrument embodying my invention, the case being shown in section. Fig. 2 is a transverse sectional view of the instrument on line II—II of Fig. 1, and Fig. 3 is a face view of the magnets that are employed in the instrument.

The operating parts of the instrument are inclosed within a casing 1 having a glass front 2 and are carried by an annular dial or supporting plate 3 that is mounted within the casing upon posts 4 that are interposed between the said plate and the back of the casing. The plate 3 is secured to the front ends of the posts 4 by means of a tap bolt 5 and a tap screw 6, and the posts 4 are secured to the back of the casing 1 by means of bolts 7 that project through the casing and are extended and provided upon their outer ends with nuts 8 whereby the instrument may be secured upon a switchboard or to any other suitable support (not shown).

The operating parts of the instrument comprise two permanent bar magnets 9 and 10 the main portions of which are substantially semi-annular in contour and are of such dimensions as to fit the interior of the casing, and the ends of which are bent inwardly at nearly diametrically opposite points.

Independently secured, by means of bolts 11, to one pair of the adjacent inwardly turned ends of the respective magnets 9 and 10, are two pole pieces 12 and 13 which abut against each other and the free ends of which form a substantially semi-annular pole member that is common to both magnets. Similarly secured to the remaining inwardly turned ends of the permanent magnets are two pole pieces 14 and 15 that also abut against each other to form a pole member having a concave face located adjacent to the outer face of the pole members 12—13 but separated therefrom by a cylindrically curved air gap. The magnets are secured to the dial plate 3 by means of tap bolts 16 passing respectively through the polar projections in such a manner that each magnet may be inserted into and removed from the instrument independently of the other. It will be observed that, since the magnetic circuit is divided along a neutral plane that separates the pole pieces 12 and 14 from the pole pieces 13 and 15, and also since the circuits of the magnets remain undisturbed and unaffected when they are removed from the instrument, the degree of magnetism possessed thereby and, consequently, the sensitiveness and the accuracy of operation of the instrument will remain unaffected when either or both of the magnets are removed from the instrument, providing, of course, that none of the pole pieces are removed from the magnets.

Threaded upon the curved portion of the pole members 12—13 is a coil 17, one side of which is movable in the air gap between the pole members 12—13 and 14—15, the said coil being pivotally mounted upon pins 18 the bearings 19 for which are concentric with the said air gap. The bearings are mounted in screws 20 and 21 that are threaded, respectively, in brackets 22 and 23, the former of which is secured to the front face of the dial plate 3 and the latter of which is secured to the back of the said plate. Current is conducted to and from the movable coil 17 by means of spiral springs 24 against the torsion of which the movable coil is operated by the actuating forces in the instrument, the movable element of the instrument carrying a pointer 25 that moves adjacent to a graduated scale 26. The movable coil 17 normally occupies the position indicated in broken lines in Fig. 1, and is moved from right to left a distance proportional to the amount of current traversing the said coil, according to well-understood principles.

From an inspection of the drawings, it will be seen that, in assembling the instrument, the sensitive movable parts may be first mounted upon the dial plate and adjusted, and the magnets may then be placed in the instrument without disturbing the adjustment of the movable parts. Such an arrangement greatly facilitates the manufacture of the instrument and also renders it susceptible of ready dismantling for inspection and repairing without disturbing carefully adjusted parts or otherwise affecting the sensitiveness or calibration of the instrument.

I claim as my invention:

1. In an electrical measuring instrument, the combination with two independently mounted magnets having pole pieces of one polarity that abut against each other to form a substantially semi-annular pole member, and pole pieces of the other polarity that abut against each other to form a pole member separated from the other pole member by a substantially semi-cylindrical air gap, of a movable coil threaded upon the semi-annular pole member.

2. In an electrical measuring instrument, the combination with two independently mounted magnets provided with abutting annularly curved pole pieces, and abutting pole pieces having cylindrically curved faces separated from said annularly curved pole pieces by a narrow air gap, of a movable coil threaded upon the annularly curved pole pieces.

3. In an electrical measuring instrument, a field magnet comprising two independently mounted permanent magnets having annularly curved pole pieces that abut against each other to form a substantially semi-annular pole member and concave pole pieces that abut against each other and partially embrace said annularly curved pole pieces but are separated therefrom by a semi-cylindrical air gap.

4. In an electrical measuring instrument, the combination with two independently mounted curved magnets disposed in the same plane and provided with annularly curved abutting pole pieces and concave abutting pole pieces forming two-part pole members that are separated from each other by a semi-cylindrical air gap, of a movable coil threaded upon the annularly curved pole pieces and mounted independently of the said magnets.

5. In an electrical measuring instrument, the combination with two independently mounted permanent magnets having pole pieces which abut against each other to form pole members separated by a cylindrically curved air gap, of an independently mounted coil surrounding one of said pole members and having one side located and movable in said air gap.

In testimony whereof, I have hereunto subscribed my name this 29th day of August, 1907.

PAUL MacGAHAN.

Witnesses:
M. C. RYPNISHI,
BIRNEY HINES.